(12) United States Patent
Bhandari et al.

(10) Patent No.: US 8,584,095 B2
(45) Date of Patent: Nov. 12, 2013

(54) TEST SUPPORT SYSTEM, METHOD AND COMPUTER PROGRAM PRODUCT, WHICH OPTIMIZE TEST SCENARIOS TO MINIMIZE TOTAL TEST TIME

(75) Inventors: Sakura Bhandari, Kanagawa (JP); Yuriko Nishikawa, Kanagawa (JP); Kaoru Shinkawa, Tokyo (JP); Yoshinori Tahara, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/945,806

(22) Filed: Nov. 12, 2010

(65) Prior Publication Data
US 2011/0154127 A1    Jun. 23, 2011

(30) Foreign Application Priority Data
Dec. 21, 2009   (JP) ................................. 2009-288976

(51) Int. Cl.
*G06F 9/44*   (2006.01)

(52) U.S. Cl.
USPC ........................... 717/127; 717/128; 717/140

(58) Field of Classification Search
USPC ................. 717/124–131, 140–143
See application file for complete search history.

(56) References Cited

U.S. PATENT DOCUMENTS

| | | | | |
|---|---|---|---|---|
| 5,287,490 A | * | 2/1994 | Sites ............................. | 717/142 |
| 5,317,740 A | * | 5/1994 | Sites ............................. | 717/129 |
| 6,138,112 A | * | 10/2000 | Slutz ............................. | 707/748 |
| 7,028,290 B2 | * | 4/2006 | Srivastava et al. ............. | 717/124 |
| 7,464,372 B2 | * | 12/2008 | Achlioptas et al. ............ | 717/124 |
| 7,484,220 B2 | | 1/2009 | Kelley et al. | |
| 7,490,319 B2 | * | 2/2009 | Blackwell et al. ............. | 717/124 |
| 7,590,520 B2 | * | 9/2009 | Nachmanson et al. ......... | 703/22 |
| 7,596,778 B2 | * | 9/2009 | Kolawa et al. ................ | 717/126 |

(Continued)

FOREIGN PATENT DOCUMENTS

| | | |
|---|---|---|
| JP | 2000020349 | 1/2000 |
| JP | 2000-207248 | 7/2000 |

(Continued)

OTHER PUBLICATIONS

Han et al, "Evaluation of Software Testing Process based on Bayesian networks" IEEE, pp. 361-365, 2010.*

(Continued)

*Primary Examiner* — Anil Khatri
(74) *Attorney, Agent, or Firm* — North Shore Patents, P.C.; Michele Liu Baillie; Lesley Leonessa

(57) ABSTRACT

Testing of a computer program product by selecting a test node at which a snapshot is to be acquired to enable the completion of tests along test scenarios in the shortest time is provided. Information on a test scenario, information on a test node to which a test node makes a next transition, and other information are stored. For each test node, it is determined whether a branch path exists, and for each of these test nodes, an estimated execution time required to complete a test when a snapshot is acquired at a test node is calculated, an execution time required to complete a test without acquiring any snapshot is calculated, and a difference between the execution time and the estimated execution time is calculated as a reduced time. A test node with the longest reduced time is selected, and information for identifying the selected test node is output.

18 Claims, 12 Drawing Sheets

(56) References Cited

U.S. PATENT DOCUMENTS

| | | | |
|---|---|---|---|
| 7,676,794 B2 | 3/2010 | Akiyama et al. | |
| 7,774,759 B2 * | 8/2010 | Sun | 717/128 |
| 7,823,135 B2 * | 10/2010 | Horning et al. | 717/127 |
| 7,853,932 B2 * | 12/2010 | Chockler et al. | 717/132 |
| 7,950,004 B2 * | 5/2011 | Vieira et al. | 717/125 |
| 8,046,749 B1 * | 10/2011 | Owen et al. | 717/141 |
| 8,122,436 B2 * | 2/2012 | Costa et al. | 717/128 |
| 8,176,475 B2 * | 5/2012 | Kosche et al. | 717/127 |
| 8,296,739 B2 * | 10/2012 | Kalla et al. | 717/127 |
| 8,302,085 B2 * | 10/2012 | Schellekens | 717/143 |
| 8,438,546 B2 * | 5/2013 | Wolf | 717/127 |
| 8,448,144 B2 * | 5/2013 | Rossi et al. | 717/126 |
| 2007/0043980 A1 | 2/2007 | Ohashi et al. | |
| 2009/0193294 A1 | 7/2009 | Nakamura et al. | |

FOREIGN PATENT DOCUMENTS

| | | |
|---|---|---|
| JP | 2000-215082 | 8/2000 |
| JP | 2004-005399 | 1/2004 |
| JP | 2006112852 | 4/2006 |
| JP | 2007-052703 | 3/2007 |
| JP | 2007-0241697 | 9/2007 |
| JP | 2008-052359 | 3/2008 |
| JP | 2009-086701 | 4/2009 |
| JP | 2009-176246 | 8/2009 |
| JP | 2009-181560 | 8/2009 |
| WO | 2005-119445 | 12/2005 |

OTHER PUBLICATIONS

Poulding et al, "A Principled Evaluation of the Effect of Directed Mutation on Search-Based Statistical Testing", IEEE, pp. 184-193, 2011.*

Guderlei et al, "Testing Randomized Software by Means of Statistical Hypothesis Tests", ACM 46-54, 2007.*

Groce et al, "Random Testing and Model Checking: Building a Common Framework for Nondeterministic Exploration", ACM, pp. 1-7, 2008.*

* cited by examiner

| SCENARIO ID | PROCESS ID | PROCESS | SOURCE TEST NODE | DESTINATION TEST NODE |
|---|---|---|---|---|
| 0001 | 1<br>2<br>3<br>4<br>5<br>6 | BOOT PC<br>RUN APPLICATION<br>LOGIN<br>OPEN JOB xxx<br>COMPILE<br>EXECUTE | 0<br>1<br>2<br>3<br>4<br>5 | 1<br>2<br>3<br>4<br>5<br>6 |
| 0002 | 1<br>2<br>3<br>4<br>5<br>6 | BOOT PC<br>RUN APPLICATION<br>LOGIN<br>OPEN JOB yyy<br>COMPILE<br>EXECUTE | 0<br>1<br>2<br>3<br>7<br>8 | 1<br>2<br>3<br>7<br>8<br>9 |
| XXXX | ......... | ......... | ......... | ......... |

FIG. 3

| PROCESS | ESTIMATED EXECUTION TIME | EXECUTION TIME | ESTIMATED ERROR RATE | ERROR OCCURRENCE RATE | SOURCE TEST NODE | DESTINATION TEST NODE |
|---|---|---|---|---|---|---|
| INSTALL APPLICATION | 03:11:00 | 03:30:44 | 50% | 53% | 0 | 1 |
| CREATE JOBS 1, 2 AND 3 | 00:01:00 | 00:30:15 | 40% | | 1 | 2 |
| COMPILE JOBS 1, 2 AND 3 | 00:01:00 | 00:15:15 | 30% | 45% | 2 | 3 |
| EXECUTE JOB 1 | | | | | 3 | 4 |
| ENTER RUN PARAMETER | | 00:01:10 | | | 4 | 5 |
| CLEAN UP JOB 1 | | | | 45% | 5 | 6 |
| EXECUTE JOB 2 | | 00:02:00 | 5% | 10% | 3 | 7 |
| ENTER PARAMETER 1 | | | | N/A | 7 | 8 |
| CHECK ON EXECUTION RESULT | | | | | 8 | 9 |
| CLEAN UP JOB 2 | | | | N/A | 9 | 10 |
| ENTER PARAMETER 2 | | | | | 7 | 11 |
| CHECK ON EXECUTION RESULT | | 00:02:00 | | | 11 | 12 |
| CLEAN UP JOB 2 | | | | 45% | 12 | 13 |
| EXECUTE JOB 3 | | | | | 3 | 14 |
| ENTER PARAMETER 3 | | | | | 14 | 15 |
| CHECK ON CREATED FILE | | | | | 15 | 16 |
| CHECK ON EXECUTION RESULT | | | | N/A | 15 | 17 |
| CLEAN UP JOB 3 | | | | | 17 | 18 |

FIG. 4

TEST SUPPORT SYSTEM, METHOD AND COMPUTER PROGRAM PRODUCT, WHICH OPTIMIZE TEST SCENARIOS TO MINIMIZE TOTAL TEST TIME

CROSS-REFERENCE TO RELATED APPLICATIONS

The present application relates to co-pending Japanese Patent Application No. 2009-288976, filed on Dec. 21, 2009.

BACKGROUND

1. Field of Invention

The present invention relates to a test support device, a testing device, a test support method and a computer program, capable of appropriately selecting a test node at which a snapshot is to be acquired to return processing so as to enable the execution of test scenarios in the shortest time.

2. Background of the Invention

In the recent development of computer programs, the desire to add various functions grows in order to differentiate a product, and hence source code is becoming mammoth. In order to run a computer program consisting of an enormous amount of source code normally, a test needs to be executed securely without omission. Therefore, the way of executing the test on a completed computer program efficiently and securely is becoming too important to ignore in terms of the development costs.

To this end, many support software and support methods for dynamically changing and configuring test scenarios have been developed. For example, Japanese Patent Application Publication No. 2000-207248 ('248 Publication) discloses a behavior generation method for a parallel program, which analyzes, for each execution path of the program, the dependence relationship between the respective statements included in threads to determine based on the dependence relationship whether to execute an unexecuted execution path. In the '248 Publication, the parallel program can be executed based on the dependence relationship between the respective statements to be processed in parallel along efficient execution paths without generating unnecessary execution paths.

Further, Japanese Patent Application Publication No. 2008-500647 ('647 Publication) discloses a re-launching method using history information, in which history information contains a historical snapshot. Information on the state of a dynamic application associated with execution of the application is acquired, and the acquired history information is used upon re-launching of the application to enable earlier re-launching of the application. In the '647 Publication, use of the historical snapshot eliminates the need to initialize all resources upon re-launching, enabling earlier completion of re-launching.

However, as in the '248 Publication, grasping all dependence relationships for each statement results in grasping dependence relationships between test nodes in a test on a computer program, presenting practical difficulties in implementation. Further, when an error has occurred, it is also difficult to determine the range of test scenarios affected by the error that has occurred.

Further, use of a historical snapshot as in the '647 Publication can lead to determining a return point from an end test node and a return point upon occurrence of an error in the test on the computer program. However, it takes a predetermined time to acquire the historical snapshot. Therefore, as the scale of an application increases, it becomes important to determine at which test node the historical snapshot is to be acquired. Since historical snapshots of all resources are acquired, the concept of limiting test nodes to be acquired is not present therein.

BRIEF SUMMARY

According to an embodiment of the present invention, a test support method stores information on a test scenario for a computer program that defines a plurality of test nodes and processes between the test nodes. For each test node, the test support method stores information on the test node, including information for identifying another test node to which the test node makes a next transition, and information on whether the test node includes a branch path to which a process branches. The test support method determines whether the branch path exists for each test node. For each test node for which the branch path is determined to exist, the test method a) calculates an estimated execution time required to complete a test when a snapshot is acquired, b) calculates an execution time required to complete the test without acquiring any snapshot, and c) calculates a difference between the execution time and the estimated execution time as a reduced time for each test node at which the snapshot is acquired. The test support method selects one of the plurality of test nodes with the longest reduced time, and outputs information for identifying the selected test node.

In one aspect of the present invention, the test support method stores an error probability as the probability of occurrence of error for each process. Based on the error probability, the test support method calculates the estimated execution time as an expected value for the execution time.

In one aspect of the present invention, the test support method calculates and stores the error probability based on the results of actual occurrence of error at the time of executing the test plural times.

In one aspect of the present invention, the test support method acquires a snapshot at the selected test node. Upon reaching a test node located at an end of the test scenario, the test support method continues the test by returning to the selected test node.

In one aspect of the present invention, the test support method determines whether an error has occurred at the selected test node, and in response to determining that the error has occurred at the selected test node, the test support method aborts an execution of processes in the test scenario on and after the selected test node.

System and computer program products corresponding to the above-summarized methods are also described and claimed herein.

BRIEF DESCRIPTION OF THE SEVERAL VIEWS OF THE DRAWINGS

FIG. 3 is a diagram illustrating an example of the data structure of a test scenario information storage section according to the first embodiment of the present invention.

FIG. 4 is a diagram illustrating an example of the data structure of a test node information storage section according to the first embodiment of the present invention.

DETAILED DESCRIPTION

Figure 1:
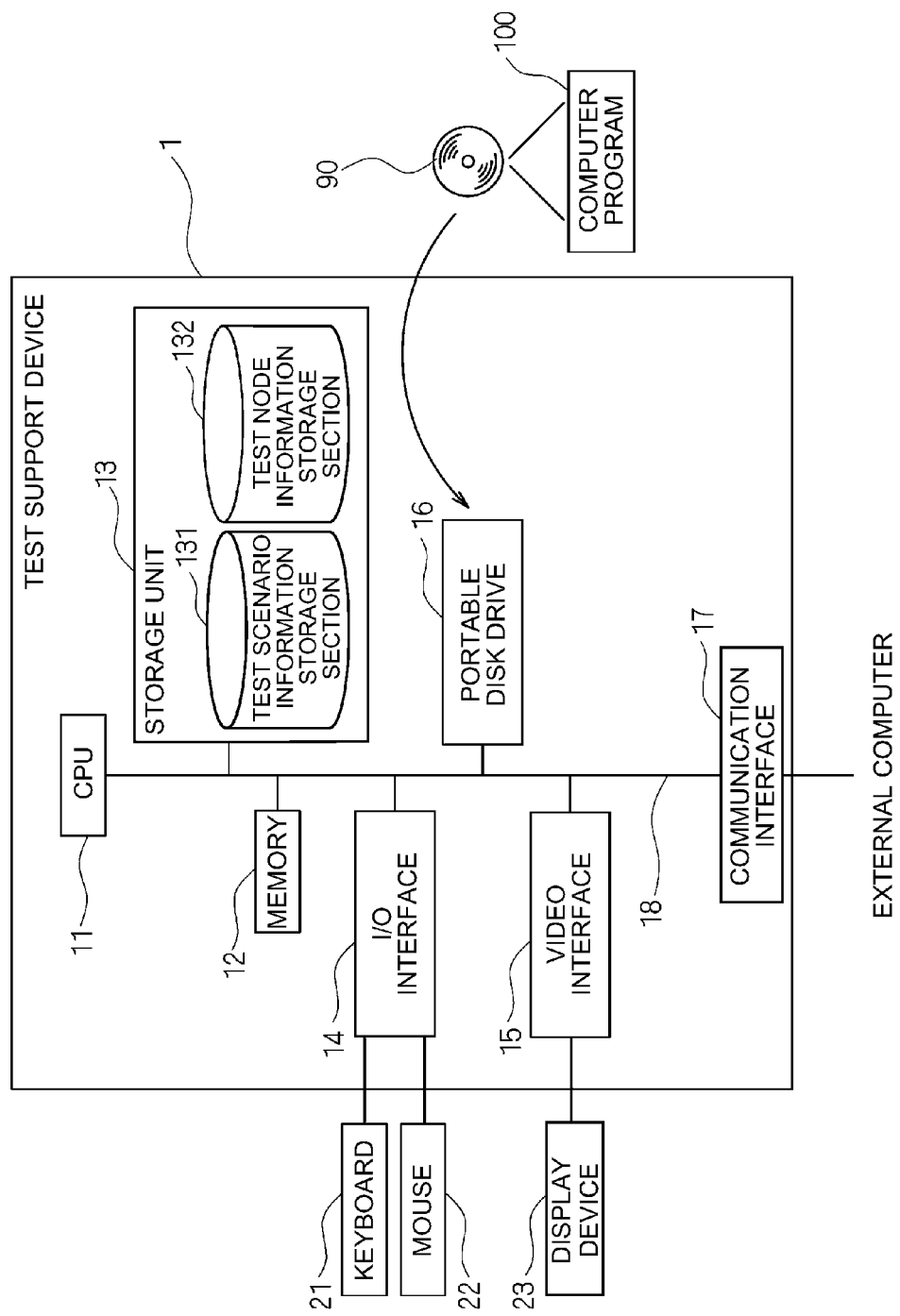
FIG. 1 is a block diagram showing an example of configuring a test support device using a CPU according to a first embodiment of the present invention.

Test support devices according to the embodiments of the present invention will be specifically described below with reference to the accompanying drawings. The following embodiments do not limit the inventions described in the scope of claims, and not all the combinations of features described in the embodiments are requisites as resolving means of the present invention.

Further, the present invention can be carried out in a variety of different modes, and should not be limited to the contents of description of the embodiments. Note that the same reference numerals are employed throughout the embodiments to denote the same elements.

In the following embodiments, a test support device is described which is implemented by installing a computer program into a computer system. As will be apparent to those skilled in the art, part of the present invention may be implemented as a computer program capable of being executed on a computer. Therefore, the present invention may take the form of a mode as the hardware of a test support device, a mode as software, or a mode as a combination of software and hardware. The computer program may be recorded on a recording medium readable by any computer, such as a hard disk, a DVD, a CD, an optical storage device, or a magnetic storage device.

According to the embodiments of the present invention, a test node with the longest reduced time is selected from among test nodes where a branch path(s) exists, in which the reduced time can be obtained by acquiring a snapshot. The snapshot is acquired at the selected test node, and when the end test node is reached or when an error occurs, the processing method returns to the test node at which the snapshot is acquired, so that not only can all tests be completed unwastefully, but also the total test time required for the tests can be minimized.

FIG. 1 is a block diagram showing an example of configuring a test support device using a CPU according to a first embodiment of the present invention. As shown in FIG. 1, a test support device 1 includes at least a CPU (Central Processing Unit) 11, a memory 12, a storage unit 13, an I/O interface 14, a video interface 15, a portable disk drive 16, a communication interface 17 and an internal bus 18 interconnecting the above-mentioned hardware components.

The CPU 11 is connected to each of the above-mentioned hardware components of the test support device 1 through the internal bus 18 to control the operation of each of the above-mentioned hardware components and execute various software functions according to a computer program 100 stored in the storage unit 13. The memory 12 is configured as a volatile memory, such as SRAM or SDRAM, on which load modules are deployed when the computer program 100 is executed, and stores temporary data and other data generated during the execution of the computer program 100.

The storage unit 13 is configured as a built-in fixed type storage unit (hard disk), a ROM, or the like. The computer program 100 stored in the storage unit 13 may be downloaded from a portable recording medium 90, such as a DVD or a CD-ROM, on which the program and data are recorded, through the portable disk drive 16, and loaded from the storage unit 13 into the memory 12 at its run-time. The computer program may also be downloaded from an external computer connected through the communication interface 17.

The storage unit 13 includes a test scenario information storage section (scenario information storage means) 131 and a test node information storage section 132. Stored in the test scenario information storage section 131 are information on a test scenario defining multiple test nodes and processes between the test nodes, e.g., information on a test node starting a test, information on a test node corresponding to the end test node, etc.

Figure 2:
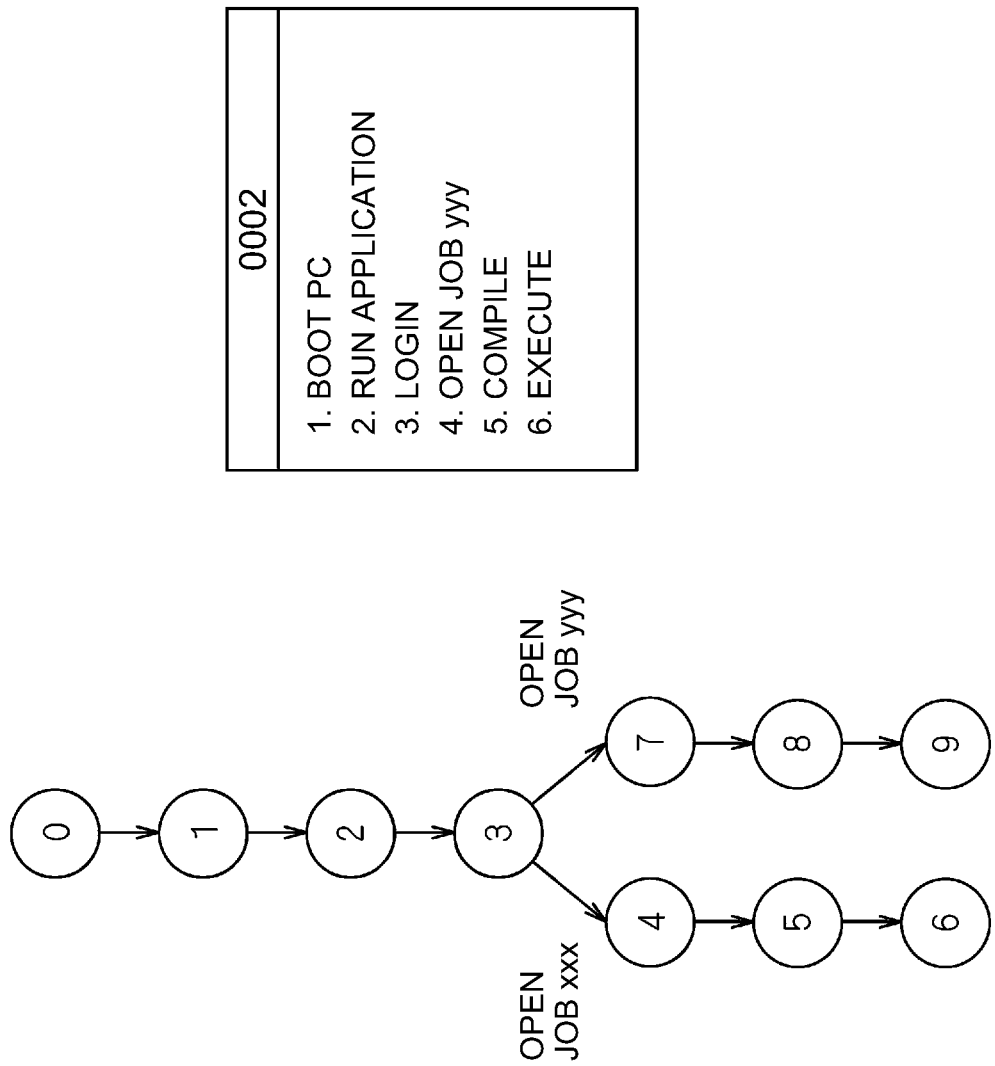
FIG. 2 is a diagram illustrating example test scenarios and state transitions according to the first embodiment of the present invention.

FIG. 2 is a diagram illustrating example test scenarios and state transitions according to the first embodiment of the present invention. In the example of FIG. 2, two test scenarios (scenario IDs: 0001 and 0002) are shown with their processes. The scenario IDs '0001' and '0002' are different only in that a job with process ID '4' to be executed is 'xxx' or 'yyy.'

Thus, representing processing status by an encircled number in a state transition diagram shown in the middle of the drawing, processes up to process ID '3' have the same processing statuses in the respective scenarios, whereas the processing statuses of process ID '4' and beyond are different from scenario to scenario. Hereinafter, each processing status is called a test node, and a path between test nodes corresponds to each process.

FIG. 3 is a diagram illustrating an example of the data structure of the test scenario information storage section 131 according to the first embodiment of the present invention. As shown in FIG. 3, information on the test scenarios is configured to identify what kind of process is included in each scenario and identify to which path each process corresponds by a source test node and a destination test node. From the test scenario information storage section 131, it can be known which test node is the end test node (the final test node in a series of processes).

Stored in the test node information storage section 132 are information on the test nodes, which include information for identifying a test node to which a source test node makes a transition next, and information as to whether the test node includes a branch path to which a process branches. FIG. 4 is a diagram illustrating an example of the data structure of the test node information storage section 132 according to the first embodiment of the present invention, and FIG. 5 is a diagram illustrating an example of multiple test scenarios and state transitions according to the first embodiment of the present invention.

Figure 5:
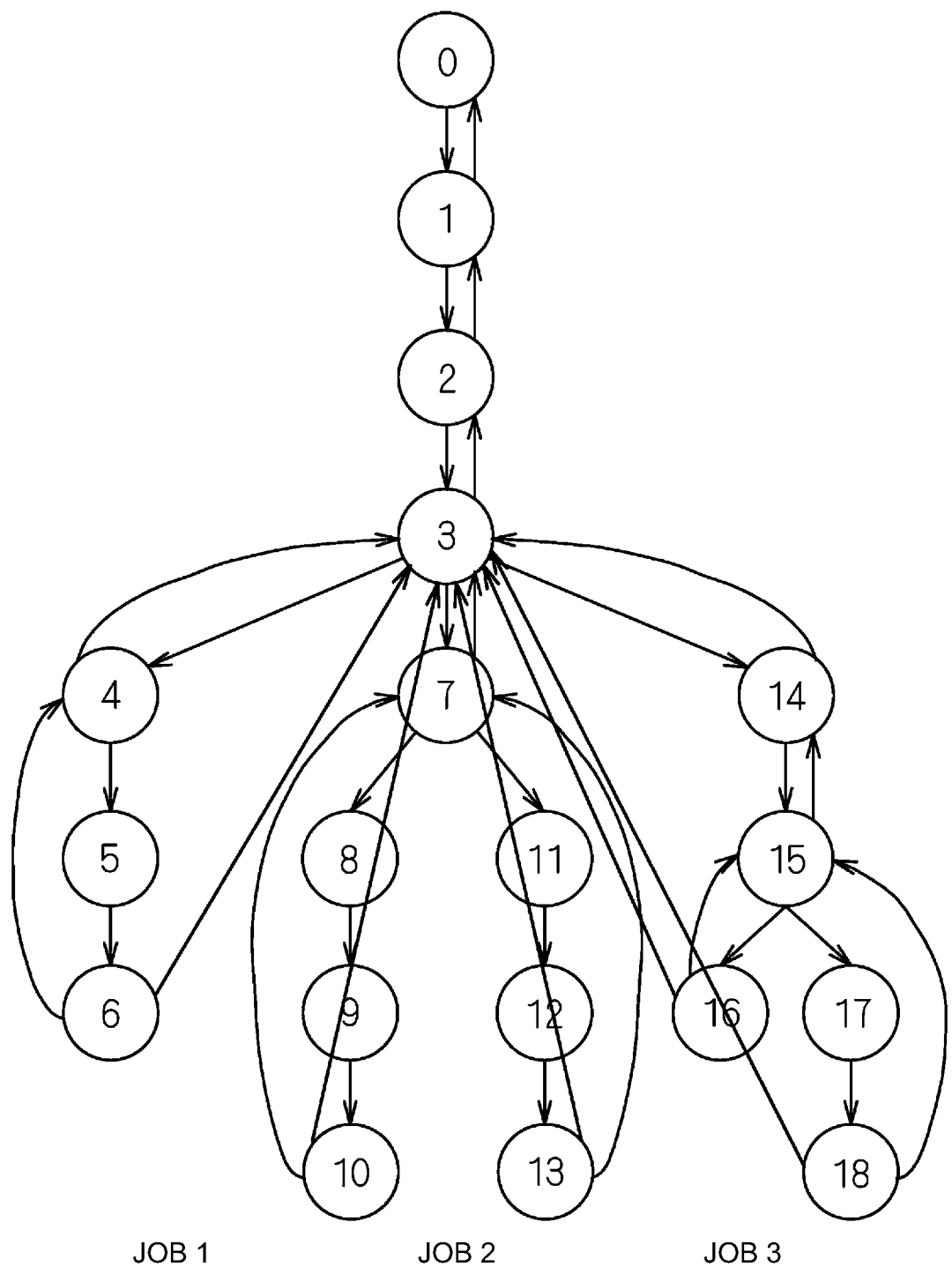
FIG. 5 is a diagram illustrating an example of multiple test scenarios and state transitions according to the first embodiment of the present invention.

As will be apparent from the state transition diagram of FIG. 5, test nodes used in test scenarios including three jobs, i.e., job 1, job 2 and job 3 are classified into common test nodes and job specific test nodes, and information on the respective test nodes is stored collectively in the data structure shown in FIG. 4. In other words, in FIG. 4, source test nodes and destination test nodes are stored in order to identify on which path a process is to be executed. Thus, not only processes sequentially executed toward the end test node but also processes returning to predetermined test nodes can be clearly specified. It can also be determined which test node includes a branch path, depending on whether two or more destination test nodes are stored for the same source test node.

Further, in the example of FIG. 4, the estimated execution time, the execution time, the estimated error rate and the error occurrence rate are stored on a process-by-process basis. Here, the estimated execution time comprises the time required to complete all tests when a snapshot is acquired at a source test node, and the execution time comprises the time required to complete all tests without acquiring any snapshot at the source test node. However, in FIG. 4, the estimated execution time and the execution time are stored as the estimated execution time and the execution time on a process-by-process basis, and they are used as underlying data for calculating the total test time.

Further, the estimated error rate and the error occurrence rate are stored as error probabilities. The estimated error rate comprises the probability of occurrence of error in each process, and the error occurrence rate comprises the probability that an error has actually occurred in each process. The estimated error rate may be used until an error actually occurs and the error occurrence rate may be used after the error occurs, or the error occurrence rate may be used after the test is executed a predetermined number of times. In other words, a value calculated for the error occurrence rate based on the results of multiple test executions is stored.

Returning to FIG. 1, the communication interface 17 is connected to the internal bus 18 and can exchange data with an external computer, e.g., a testing device for executing the test, by being connected to an external network such as the Internet, LAN, or WAN.

The I/O interface 14 is connected to data input media, such as a keyboard 21 and a mouse 22, to receive data input. The video interface 15 is connected to a display device 23, such as a CRT monitor or an LCD, to display certain images.

Figure 6:
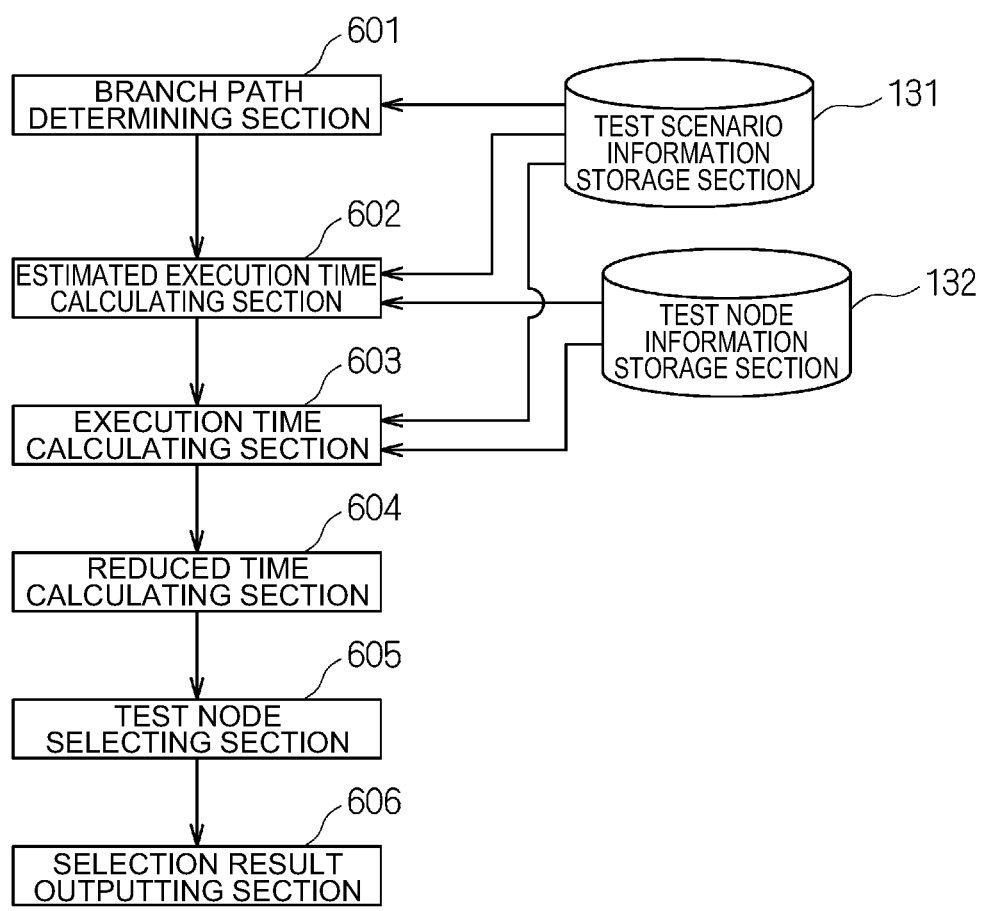
FIG. 6 is a functional block diagram of the test support device according to the first embodiment of the present invention.

The following describes the operation of the test support device 1 having the above described configuration. FIG. 6 is a functional block diagram of the test support device 1 according to the first embodiment of the present invention. In FIG. 6, a branch path determining section (first determining means) 601 determines whether there exists a branch path for each test node.

Specifically, the test node information storage section 132 of the storage unit 13 is referenced to extract a process involving two or more test nodes (destination test nodes) to which a state transition is to be made next. The procedure proceeds to a job specific process from the source test node of the process involving the multiple test nodes to which a state transition is to be made next.

An estimated execution time calculating section 602 calculates an estimated execution time required to complete all tests when a snapshot of a test node is acquired, where it is determined that a branch path exists from the test node. An execution time calculating section 603 calculates an execution time required to complete all tests without acquiring any snapshot. A reduced time calculating section 604 calculates, as the reduced time, a difference between the execution time and the estimated execution time.

The estimated execution time and execution time of each process are read from the test node information storage section 132. Then, the sum of the estimated execution time and execution time of each process is calculated as the estimated execution time and the execution time required to execute the test along all the test scenarios, i.e., to complete the test.

Figure 7:
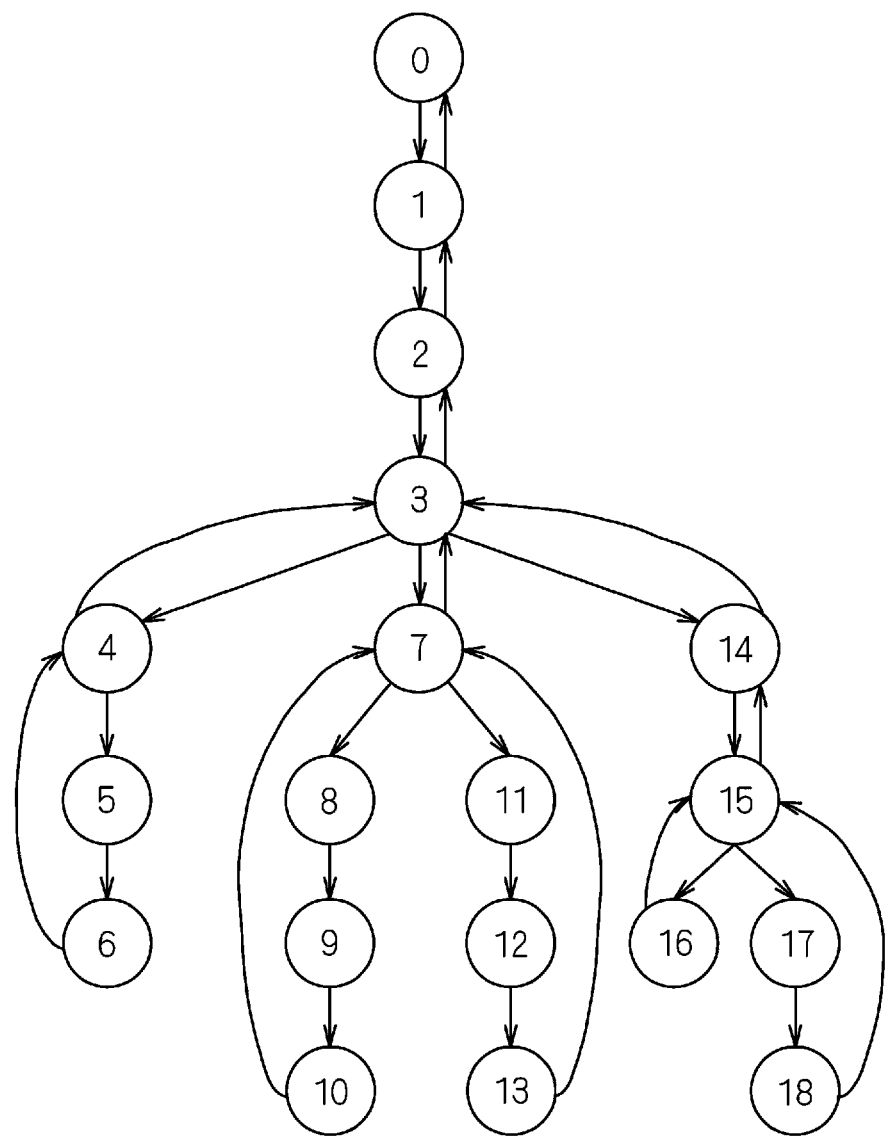
FIG. 7 is a diagram illustrating an example of multiple test scenarios and state transitions according to the first embodiment of the present invention.

FIG. 7 is a diagram illustrating an example of multiple test scenarios and state transitions according to the first embodiment of the present invention. Unlike the state transition diagram of FIG. 5, it is assumed that the test is executed continuously along the test scenarios by returning from the end test node of each test scenario only to the nearest test node having a branch path. Therefore, no error occurrence is also assumed.

In the example of FIG. 7, in order to execute the test completely along all the test scenarios, the test is executed according to the following paths in which numbers indicate the respective test nodes: 0→1→2→3→4→5→6→4→3→7→8→9→10→7→11→12→13→7→3→14→15→16→15→17→18 (→15→14→3→2→1→0). Since the estimated execution time and execution time of a process corresponding to each path between test nodes are stored in the test node information storage section 132, the total test time can be calculated as the sum of them.

When an error occurs at any test node in the state transition diagram of FIG. 7, the execution of processes corresponding to paths included in a test scenario on and after the test node at which the error has occurred is aborted. If the execution of processes is aborted in a certain test scenario, a path to a test scenario capable of executing the test needs to be recovered so that the test is executed for the test scenario for which no test is executed yet.

For example, in FIG. 7, if an error occurs at test node 7 during the execution of a test along test scenarios involving test nodes 0→1→2→3→4→5→6→4→3→7, processes to be executed at test nodes 7→8→9→10 that needed to execute a test in a normal situation are aborted. Processes to be executed at test nodes 7→11→12→13 that needed to execute a test through a branch path are also aborted.

The test scenario including paths of the processes the execution of which is aborted is deleted so that the processes will not be detected as processes to be executed in the subsequent test. Thus, paths of test nodes 7→3→14 need to be recovered to make a transition to test node 14 in order to execute the test on a test scenario on which no test is executed yet.

The following describes a calculation method for estimated execution time T1 and execution time T2 of a test scenario at the time of storing the error occurrence rate as the probability of occurrence of error on a process-by-process basis. For the sake of simplifying the description, a test scenario consisting of four test nodes will be described. FIG. 8 is a diagram illustrating example state transitions when an error has occurred and no error has occurred on a test scenario with no snapshot being acquired, according to the first embodiment of the present invention.

Figure 8A:
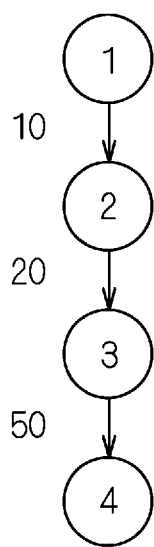
FIG. 8 is a diagram illustrating example state transitions when an error has occurred no error has occurred on a test scenario with no snapshot being acquired according to the first embodiment of the present invention.
Figure 8B:
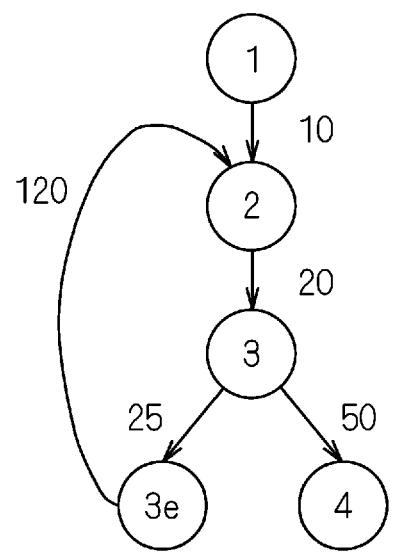

FIG. 8A shows a state transition when no error has occurred, and FIG. 8B shows a state transition when an error has occurred. Note that a number attached to each path indicates the execution time required to execute a process on the path.

In FIG. 8A, the execution time required to execute a test along the test scenario involving test nodes 1→2→3→4 is (10+20+50=) 80 sec., while in FIG. 8B, the execution time required to execute a test along the test scenario involving test nodes 1→2→3→3e→2→3→4 is (10+20+25+120+20+50=) 245 sec. because of returning to test node 2 once for re-execution.

If the error occurrence rate at test node 3 is 20%, execution time T2 required to execute the test along the test scenario will be (80 sec.×0.8+245 sec.×0.2=) 113 sec., which is an expected value.

Figure 9A:
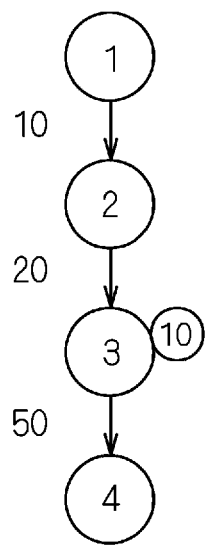
FIG. 9 is a diagram illustrating example state transitions when an error has occurred no error has occurred on a test scenario with a snapshot being acquired according to the first embodiment of the present invention.
Figure 9B:
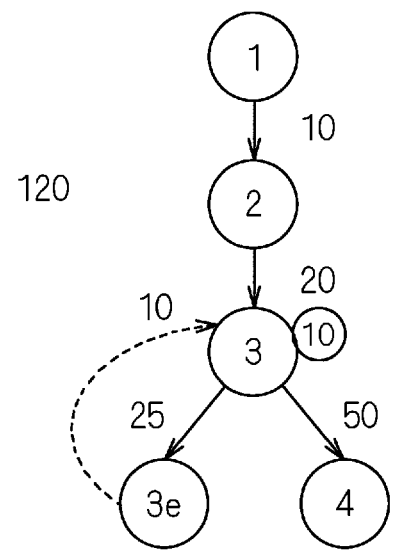

FIG. 9 is a diagram illustrating example state transitions when an error has occurred and no error has occurred on a test scenario with a snapshot being acquired, according to the first embodiment of the present invention. FIG. 9A shows a state transition when no error has occurred, and FIG. 9B shows a state transition when an error has occurred. Note that a number attached to each path indicates the execution time required to execute a process on the path.

Unlike in FIG. 8A, a time of 10 sec. required to acquire a snapshot at test node 3 is added to the estimated execution time required to execute a test along the test scenario involving test nodes 1→2→3→4 as shown in FIG. 9A. Therefore, the estimated execution time is (10+20+10+50=) 90 sec.

In FIG. 9B, there is no need to return to test node 2 because a snapshot is acquired at test node 3. However, a time of 10 sec. required to acquire a snapshot is added. Therefore, the estimated execution time required to execute a test along the test scenario involving test nodes 1→2→3→3e→3→4 is (10+20+10+25+10+50=) 125 sec.

If the error occurrence rate at test node 3 is 20%, estimated execution time T1 required to execute the test along all the test scenarios will be (90 sec.×0.8+125 sec.×0.2=) 97 sec., which is an expected value. Thus, since estimated execution time T2 is shorter than execution time T1, the case of acquiring a snapshot can further reduce the total test time.

Returning to FIG. 6, a test node selecting section (selection means) 605 selects a test node with the longest reduced time. In other words, estimated execution time T2 when a snapshot is acquired as mentioned above is calculated for each test node where a branch path exists to select a test node with the longest reduced time as the difference between execution time T1 and estimated execution time T2.

A selection result outputting section (output means) 606 outputs information for identifying the selected test node. The output method is not particularly limited. The output may be displayed on the display screen of the display device 23, or transmitted as an instruction signal for acquiring the snapshot to an external computer through the communication interface 17.

Figure 10:
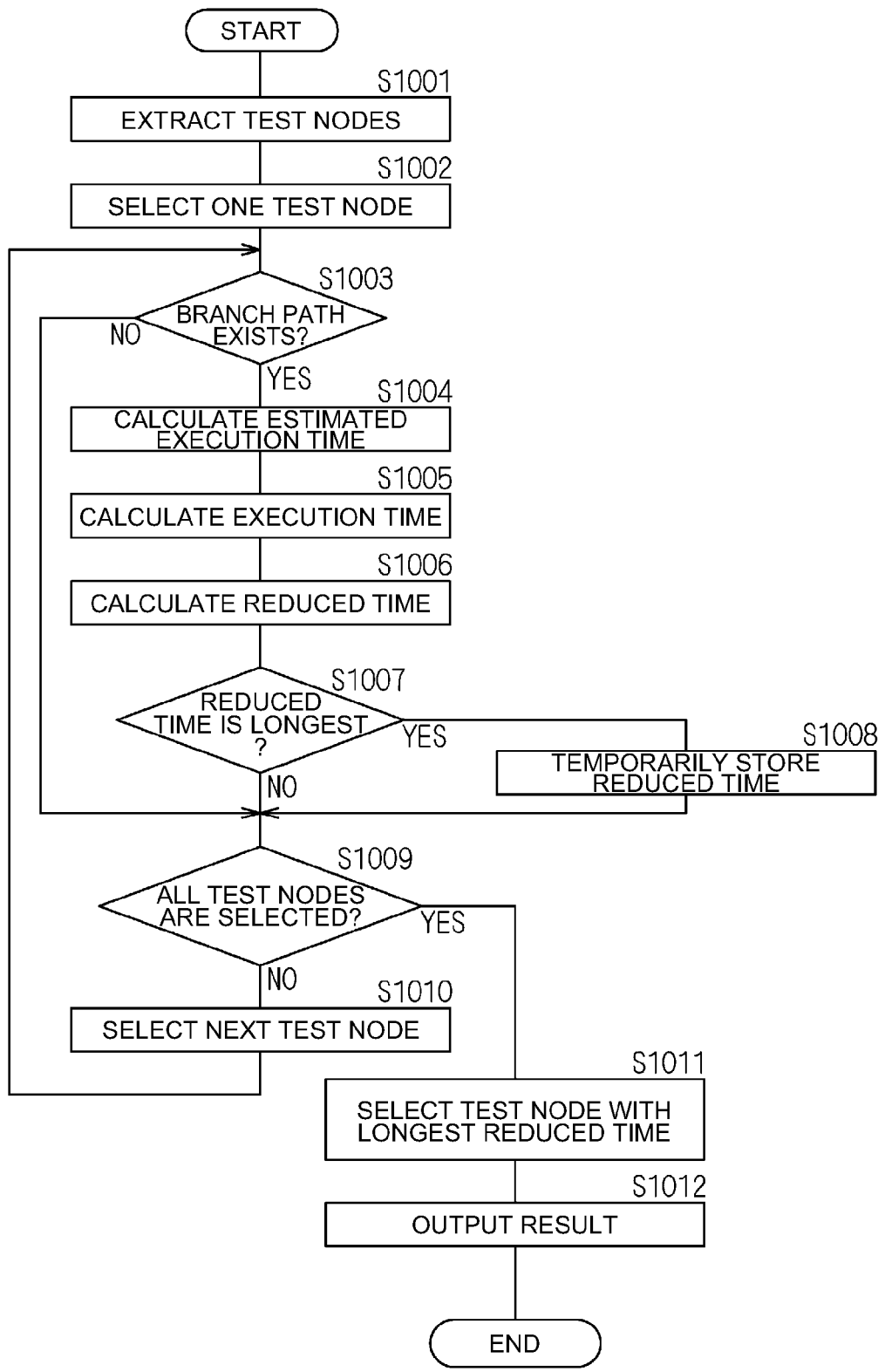
FIG. 10 is a flowchart showing a processing method performed by the CPU of the test support device according to the first embodiment of the present invention.

FIG. 10 is a flowchart showing a processing method performed by the CPU 11 of the test support device 1 according to the first embodiment of the present invention. In FIG. 10, a case where one test node with the longest reduced time is selected for the sake of simplifying the description. The CPU 11 of the test support device 1 refers to the test node information storage section 132 of the storage unit 13 to extract test nodes along a predetermined test scenario (S1001), selects one test node (S1002), and determines whether a branch path exists from the selected test node (S1003).

If the CPU 11 determines that a branch path exists (YES in S1003), the CPU 11 calculates the estimated execution time required to complete a test when a snapshot is acquired at the test node on which it is determined that the branch path exists (S1004), and calculates the execution time required to complete a test without acquiring any snapshot at the test node (S1005). The CPU 11 calculates, as the reduced time, a difference between the execution time and the estimated execution time (S1006).

The estimated execution time and execution time of each process are read from the test node information storage section 132. Then, based on the read estimated execution time and execution time of each process, the estimated execution time and execution time required to execute the test along all the test scenarios are calculated as a sum that includes the snapshot acquisition time.

The CPU 11 determines whether the calculated reduced time is longest (S1007). Specifically, the determination is made based on whether the calculated reduced time is longer than the reduced time already calculated and temporarily stored in the memory 12. If the CPU 11 determines that the calculated reduced time is longest (YES in S1007), the CPU 11 temporarily stores the calculated reduced time in the memory 12 (S1008).

If the CPU 11 determines that the calculated reduced time is not longest (NO in S1007) or that no branch path exists (NO in S1003), the CPU 11 determines whether all the test nodes extracted along the test scenarios are selected (S1009). If the CPU 11 determines that any unselected test node exists (NO in S1009), the CPU 11 selects the next test node (S1010) and returns the method to S1003 to repeat the above-mentioned processing.

If the CPU 11 determines that all the test nodes are selected (YES in S1009), the CPU 11 selects a test node with the longest reduced time temporarily stored in the memory 12 (S1011), and outputs, as a result, information for identifying the selected test node (S1012). The output method is not particularly limited. The output may be displayed on the display screen of the display device 23, or transmitted as an instruction signal for acquiring the snapshot to an external computer through the communication interface 17.

As described above, according to the first embodiment, a test node with the longest reduced time, which can be shortened by acquiring a snapshot, can be selected from among test nodes where a branch path exists. The snapshot is acquired at the selected test node, and when the end test node is reached or an error occurs, the method returns to the test node at which the snapshot has been acquired. This makes it possible to complete the test unwastefully and minimize the total test time required for the test.

As mentioned in the above embodiment, the selection of a test node at which a snapshot is to be acquired is not limited to the method of selecting one test node with the longest reduced time, and a predetermined number of test nodes may be selected sequentially in order from a test node with a longest reduced time. It is needless to say that when multiple test nodes are selected, such a combination to make the reduced time longest may be selected.

Further, a testing device (which may be integrated with the test support device 1 or be another computer), which has acquired information for identifying the test node output as the result, i.e., information for identifying the selected test node at which the snapshot is acquired, executes a test along test scenarios while acquiring the snapshot at the selected test node. When a test scenario reaches the end test node, or when an error occurs, it returns to a test node at which the most recent snapshot has been acquired to continue the test. This allows the test to be completed along all test scenarios without omission in the shortest time.

The configuration of a test support device according to a second embodiment of the present invention is the same as that of the first embodiment, thus the same reference numerals are given to omit the detailed description thereof. The second embodiment differs from the first embodiment in that the estimated execution time and the execution time are calculated, considering a case where the same or similar test scenarios are executed in different environments or in different time slots.

Figure 11:
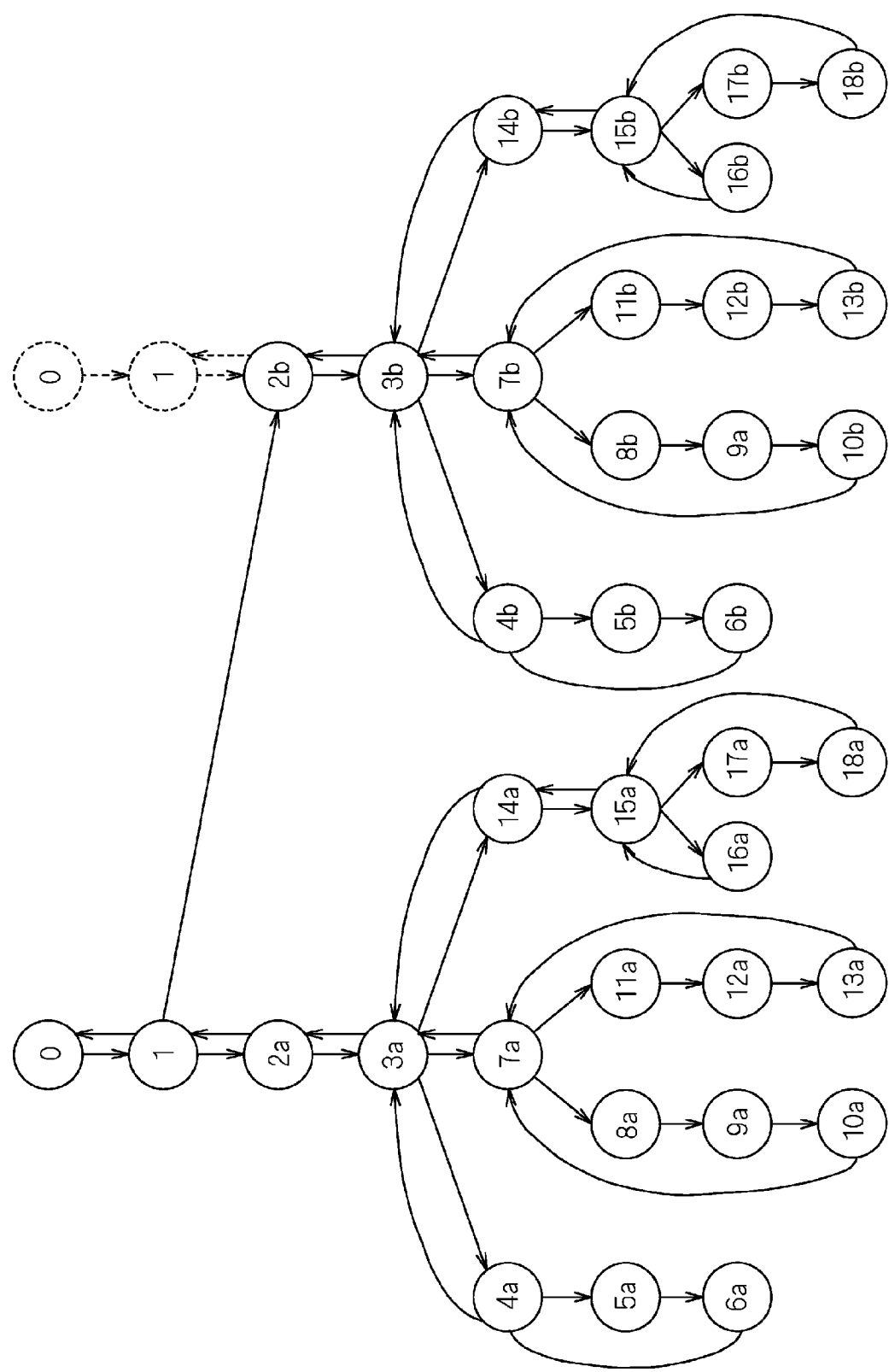
FIG. 11 is a diagram illustrating an example of multiple test scenarios and state transitions according to a second embodiment of the present invention.

FIG. 11 is a diagram illustrating an example of multiple test scenarios and state transitions according to the second embodiment of the present invention. In the example of FIG. 11, two test scenarios installed at different times are illustrated.

For example, assume that first and second test scenarios have the same test node configuration and that build A having the first test scenario is installed first and build B having the second test scenario is installed the next week to execute a test. Here, the term "build" means an environment in which the test is executed, which may be another computer having different capability or installation location, a computer program having a different version, or the like. In this case, test nodes as candidates for acquiring a snapshot at present are test nodes $3a$, $7a$ and $15a$ included in build A, while test nodes $0$, $1$, $2b$, $3b$, ..., $18b$ included in build B are excluded.

On the other hand, when the estimated execution time required to complete the test is calculated with a snapshot being acquired at a test node having a branch path, or when the execution time required to complete the test with no snapshot being acquired at the test node is calculated, test nodes $0$, $1$, $2b$, $3b$, ..., $18b$ included in build B are also included in the calculation. This may lead to a case, for example, where test node $1$ in build A, which is not a target of acquiring a snapshot in consideration of build A alone, becomes a test node for acquiring a snapshot because, in this case, it may be necessary to execute the test on and after test node $2b$ only in build B, which can reduce the total test time required for the test.

Figure 12:
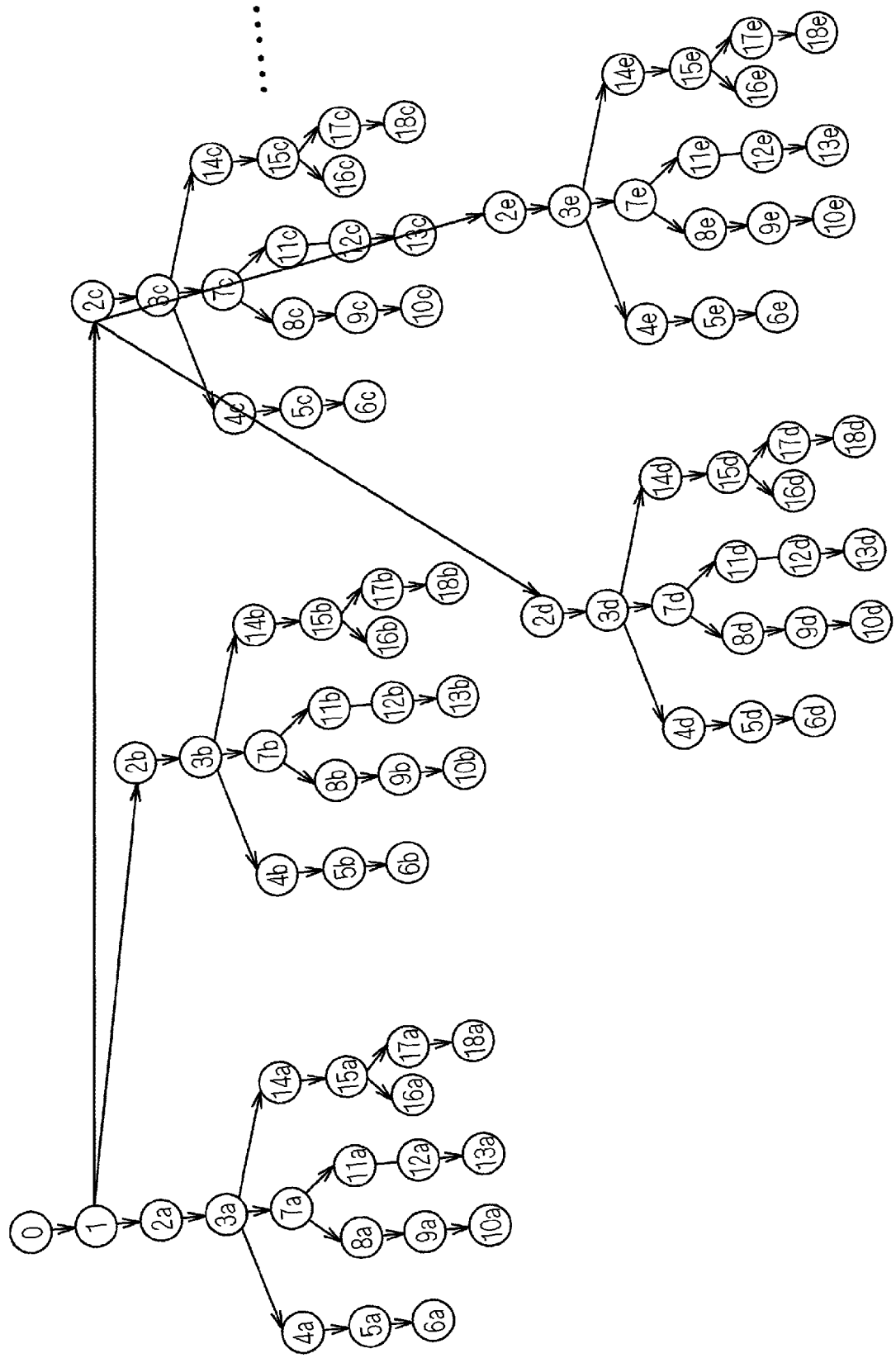
FIG. 12 is a diagram illustrating example state transitions when multiple similar test scenarios exist according to the second embodiment of the present invention.

FIG. 12 is a diagram illustrating example state transitions when multiple similar test scenarios exist according to the second embodiment of the present invention. Five test scenarios shown in FIG. 12 have the same configuration of test nodes. For three test scenarios shown in the upper part, the test is executed by installing, from the left to the right, build A having the first test scenario first, installing build B having the second test scenario the next week, and installing build C having the third test scenario the week after next. In this case, test nodes as candidates for acquiring a snapshot at present are test nodes $3a$, $7a$ and $15a$ included in build A, while test nodes $2b$, $3b$, ..., $18b$ included in build B and test nodes $2c$, $3c$, ..., $18c$ included in build C are excluded.

Further, for two test scenarios shown in the lower part, the test is executed by installing, from the left to the right, patch D for build C having the third test scenario as build D, and installing patch E for build C having the third test scenario as build E at a later time. In this case, test nodes as candidates for acquiring a snapshot at present are also test nodes $3a$, $7a$ and $15a$ included in build A, while test nodes $2d$, $3d$, ..., $18d$ included in build D and test nodes $2e$, $3e$, ..., $18e$ included in build E are excluded.

When the estimated execution time required to complete the test is calculated with a snapshot being acquired, or when the execution time required to complete the test is calculated with no snapshot being acquired, test nodes $2b$ to $18b$ included in build B, test nodes $2c$ to $18c$ included in build C, test nodes $2d$ to $18d$ included in build D and test nodes $2e$ to $18e$ included in build E are also included in the calculation. This may lead to a case, for example, where test node $1$ in build A, which is not a test node acquiring a snapshot in consideration of build A alone, becomes a test node for acquiring a snapshot. This can reduce the total test time required for the test.

As a simple example, a method of calculating estimated execution time T1 and execution time T2 of a test scenario at the time of storing the error occurrence rate as the probability of occurrence of error in each process will be described. For the sake of simplifying the description, a test scenario consisting of four test nodes will be described. FIG. 13 is a diagram illustrating example state transitions when an error has occurred and no error has occurred on the test scenario with no snapshot being acquired according to the second embodiment of the present invention.

Figure 13A:
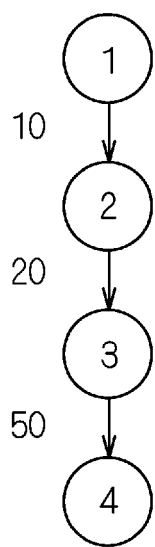
FIG. 13 is a diagram illustrating example state transitions when an error has occurred and no error has occurred on a test scenario with no snapshot being acquired according to the second embodiment of the present invention.
Figure 13B:
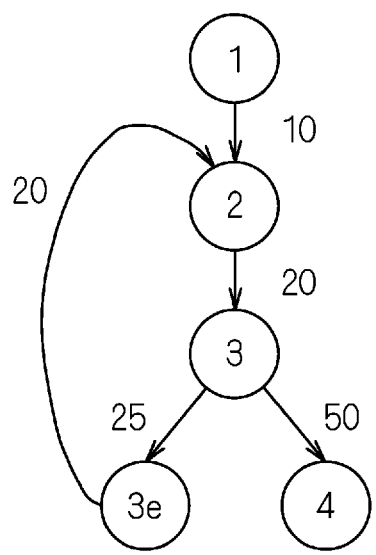

FIG. 13A shows a state transition when no error has occurred and FIG. 13B shows a state transition when an error has occurred. Note that a number attached to each path indicates the execution time required to execute a process on each path.

In FIG. 13A, the execution time required to execute a test along a test scenario involving test nodes $1{\rightarrow}2{\rightarrow}3{\rightarrow}4$ of one build is $(10+20+50=)$ 80 sec., whereas in FIG. 13B, the execution time required to execute the test along another test scenario involving test nodes $1{\rightarrow}2{\rightarrow}3{\rightarrow}3e{\rightarrow}2{\rightarrow}3{\rightarrow}4$ of another build is $(10+20+25+20+20+50=)$ 145 sec. because the test is executed with a transition to test node $2$ of another build.

If the error occurrence rate at test node $3$ is 20%, execution time T2 required to execute the test along all the test scenarios will be $(80\ \text{sec.}\times0.8+145\ \text{sec.}\times0.2=)$ 93 sec., which is an expected value.

Figure 14A:
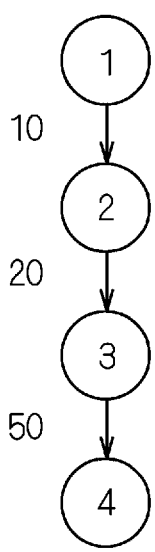
FIG. 14 is a diagram illustrating example state transitions when an error has occurred no error has occurred on a test scenario with a snapshot being acquired according to the second embodiment of the present invention.
Figure 14B:
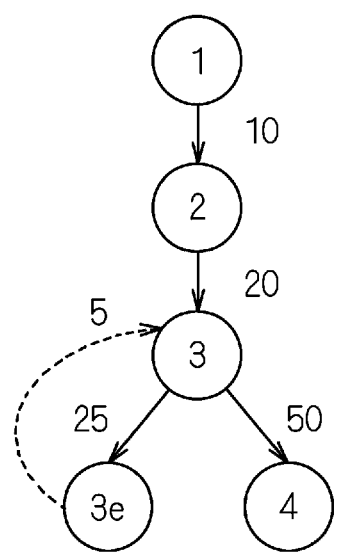

FIG. 14 is a diagram illustrating example state transitions when an error has occurred and no error has occurred on a test scenario with a snapshot being acquired according to the second embodiment of the present invention. FIG. 14A shows a state transition when no error has occurred and FIG. 14B shows a state transition when an error has occurred. Note that a number attached to each path indicates the execution time required to execute a process on each path.

Unlike in the first embodiment, the time required to acquire a snapshot at test node $3$ is not added to the estimated execution time required to execute a test along a test scenario involving test nodes $1{\rightarrow}2{\rightarrow}3{\rightarrow}4$ as shown in FIG. 14A. This is because the test is executed at a different time. Therefore, the estimated execution time is $(10+20+50=)$ 80 sec.

In FIG. 14B, the snapshot is acquired at test node $3$, and this eliminates the need to make a transition to test node $2$. In this case, the time required to acquire the snapshot is not added like in FIG. 14A. Therefore, the estimated execution time required to execute the test along all the test scenarios involving test nodes $1{\rightarrow}2{\rightarrow}3{\rightarrow}3e{\rightarrow}3{\rightarrow}4$ is $(10+20+25+5+50=)$ 110 sec.

If the error occurrence rate at test node $3$ is 20%, estimated execution time T1 required to execute the test along all the test scenarios will be $(80\ \text{sec.}\times0.8+110\ \text{sec.}\times0.2=)$ 86 sec., which is an expected value. Estimated execution time T1 is shorter than execution time T2, and this shows that the case where the snapshot is acquired can further reduce the total test time.

As described above, according to the second embodiment, a test node with the longest reduced time, which can be shortened by acquiring a snapshot, can be selected from among test nodes where a branch path exists. Therefore, by acquiring a snapshot at the selected test node in advance, it is possible to complete the test unwastefully and minimize the total test time required for the test by returning to the test node at which the snapshot has been acquired when the test is executed in another build according to a like test scenario at a later time, or when an error occurs.

The selection of a test node at which a snapshot is to be acquired is not limited to the method of selecting one test node with the longest reduced time as mentioned in the above embodiments, and a predetermined number of test nodes may be selected sequentially in order from a test node with the longest reduced time. When multiple test nodes are selected, such a combination to make the reduced time longest may be selected.

Further, a testing device (which may be integrated with the test support device 1 or be another computer), which has acquired information for identifying the test node output as the result, i.e., information for identifying the selected test node at which the snapshot is acquired, executes a test along a test scenario while acquiring the snapshot at the selected test node. When the test scenario reaches the end test node, or when an error occurs, it returns to a test node at which the most recent snapshot has been acquired to continue the test. This allows the test to be completed along all test scenarios without omission in the shortest time.

It should be noted that the present invention is not intended to be limited to the aforementioned embodiments, and various changes and improvements are possible without departing from the scope of the present invention.

What is claimed is:

1. A computer implemented method for test support, the method comprising:
   storing information on a test scenario for a computer program defining a plurality of test nodes and processes between the test nodes;
   for each test node, storing information comprising information for identifying another test node to which the test node makes a next transition, and information on whether the test node includes a branch path to which a process branches;
   for each test node, determining whether the branch path exists for the test node;
   for each test node for which the branch path is determined to exist,
      calculating an estimated execution time required to complete a test when a snapshot is acquired at the test node, wherein the test is comprised of at least one process,
      calculating an execution time required to complete the test without acquiring any snapshot, and
      calculating a difference between the execution time and the estimated execution time as a reduced time for the test node when the snapshot is acquired at the test node;
   selecting one of the plurality of test nodes with a longest reduced time, wherein the longest reduced time identifies a test node at which acquiring a snapshot minimizes a required total test time; and
   outputting information for identifying the selected test node.

2. The method according to claim 1, wherein the for each test node, the storing the information comprising information for identifying another test node to which the test node makes the next transition, and the information on whether the test node includes the branch path to which the process branches, comprises:
   storing an error probability as the probability of occurrence of error for each of the at least one process; and
   based on the error probability, calculating the estimated execution time as an expected value for the execution time.

3. The method according to claim 2, wherein the based on the error probability, calculating the estimated execution time as the expected value for the execution time, comprises:
   calculating the error probability based on results of actual occurrence of error at the time of executing the test a plurality of times.

4. The method according to claim 1, further comprising:
   acquiring a snapshot at the selected test node; and
   upon reaching a test node located at an end of the test scenario, continuing the test by returning to the selected test node.

5. The method according to claim 4, further comprising:
   determining whether an error has occurred at the selected test node; and
   in response to determining that the error has occurred at the selected test node, aborting an execution of processes in the test scenario on and after the selected test node.

6. A computer program product for a test support, the computer program product comprising:
   a computer readable storage medium having computer readable program code embodied therewith, the computer readable program code configured to:
      store information on a test scenario for a computer program defining a plurality of test nodes and processes between the test nodes;
      for each test node, store information comprising information for identifying another test node to which the test node makes a next transition, and information on whether the test node includes a branch path to which a process branches;
      for each test node, determine whether the branch path exists for the test node;
      for each test node for which the branch path is determined to exist,
         calculate an estimated execution time required to complete a test when a snapshot is acquired at the test node, wherein the test is comprised of at least one process,
         calculate an execution time required to complete the test without acquiring any snapshot, and
         calculate a difference between the execution time and the estimated execution time as a reduced time for the test node when the snapshot is acquired at the test node;
      select one of the plurality of test nodes with a longest reduced time, wherein the longest reduced time identifies a test node at which acquiring a snapshot minimizes a required total test time; and
      output information for identifying the selected test node.

7. The computer program product according to claim 6, wherein computer readable program code configured to, for each test node, store the information comprising information for identifying another test node to which the test node makes the next transition, and the information on whether the test node includes the branch path to which the process branches, is further configured to:
   store an error probability as the probability of occurrence of error for each of the at least one process; and
   based on the error probability, calculate the estimated execution time as an expected value for the execution time.

8. The computer program product according to claim 7, wherein the computer readable program code configured to, based on the error probability, calculate the estimated execution time as the expected value for the execution time, is further configured to:

calculate the error probability based on results of actual occurrence of error at the time of executing the test a plurality of times.

9. The computer program product according to claim 6, wherein the computer readable program code is further configured to:
acquire a snapshot at the selected test node; and
upon reaching a test node located at an end of the test scenario, continue the test by returning to the selected test node.

10. The computer program product according to claim 9, wherein the computer readable program code is further configured to:
determine whether an error has occurred at the selected test node; and
in response to determining that the error has occurred at the selected test node, abort an execution of processes in the test scenario on and after the selected test node.

11. A system, comprising:
a processor; and
a computer readable storage medium having computer readable program code embodied therewith, the computer readable program code configured to:
store information on a test scenario for a computer program defining a plurality of test nodes and processes between the test nodes;
for each test node, store information comprising information for identifying another test node to which the test node makes a next transition, and information on whether the test node includes a branch path to which a process branches;
for each test node, determine whether the branch path exists for the test node;
for each test node for which the branch path is determined to exist,
calculate an estimated execution time required to complete a test when a snapshot is acquired at the test node, wherein the test is comprised of at least one process,
calculate an execution time required to complete the test without acquiring any snapshot, and
calculate a difference between the execution time and the estimated execution time as a reduced time for the test node when the snapshot is acquired at the test node;
select one of the plurality of test nodes with a longest reduced time, wherein the longest reduced time identifies a test node at which acquiring a snapshot minimizes a required total test time; and
output information for identifying the selected test node.

12. The system according to claim 11, wherein computer readable program code configured to, for each test node, store the information comprising information for identifying another test node to which the test node makes the next transition, and the information on whether the test node includes the branch path to which the process branches, is further configured to:
store an error probability as the probability of occurrence of error for each of the at least one process; and
based on the error probability, calculate the estimated execution time as an expected value for the execution time.

13. The system according to claim 12, wherein the computer readable program code configured to, based on the error probability, calculate the estimated execution time as the expected value for the execution time, is further configured to:

calculate the error probability based on results of actual occurrence of error at the time of executing the test a plurality of times.

14. The system according to claim 11, wherein the computer readable program code is further configured to:
acquire a snapshot at the selected test node; and
upon reaching a test node located at an end of the test scenario, continue the test by returning to the selected test node.

15. The system according to claim 14, wherein the computer readable program code is further configured to:
determine whether an error has occurred at the selected test node; and
in response to determining that the error has occurred at the selected test node, abort an execution of processes in the test scenario on and after the selected test node.

16. A computer implemented method for test support, the method comprising:
storing information on a test scenario for a computer program defining a plurality of test nodes and processes between the test nodes;
for each test node, storing information comprising: information for identifying another test node to which the test node makes a next transition, information on whether the test node includes a branch path to which a process branches, and error probability as the probability of occurrence of error for each of at least one process;
for each test node, determining whether the branch path exists for the test node;
for each test node for which the branch path is determined to exist,
calculating an estimated execution time required to complete a test when a snapshot is acquired at the test node, wherein the test is comprised of the at least one process, wherein the estimate execution time is calculated as an expected value for an execution time based on the error probability,
calculating the execution time required to complete the test without acquiring any snapshot,
calculating a difference between the execution time and the estimated execution time as a reduced time for the test node when the snapshot is acquired at the test node;
selecting one of the plurality of test nodes with a longest reduced time, wherein the longest reduced time identifies a test node at which acquiring a snapshot minimizes a required total test time;
outputting information for identifying the selected test node;
acquiring a snapshot at the selected test node; and
upon reaching a test node located at an end of the test scenario, continuing the test by returning to the selected test node.

17. The method according to claim 16, wherein the calculating the estimated execution time as the expected value for the execution time, comprises:
calculating the error probability based on results of actual occurrence of error at the time of executing the test a plurality of times.

18. The method according to claim 17, further comprising:
determining whether an error has occurred at the selected test node; and
in response to determining that the error has occurred at the selected test node, aborting an execution of processes in the test scenario on and after the selected test node.

* * * * *